United States Patent
Bauch et al.

(10) Patent No.: US 12,470,115 B2
(45) Date of Patent: Nov. 11, 2025

(54) MULTIPLE TEMPERATURE-CONTROL PROCESS FOR WORKPIECES BY MEANS OF A TRIPLEX FURNACE

(71) Applicant: Hedrich GmbH, Ehringshausen (DE)

(72) Inventors: Karl Bauch, Asslar (DE); Gerhard Karl Mais, Limburg (DE); Wofgang Weiss, Pforring (DE)

(73) Assignee: Hedrich GmbH, Ehringshausen (DE)

( * ) Notice: Subject to any disclaimer, the term of this patent is extended or adjusted under 35 U.S.C. 154(b) by 461 days.

(21) Appl. No.: 18/041,302

(22) PCT Filed: Aug. 12, 2021

(86) PCT No.: PCT/EP2021/072456
§ 371 (c)(1),
(2) Date: Feb. 10, 2023

(87) PCT Pub. No.: WO2022/034164
PCT Pub. Date: Feb. 17, 2022

(65) Prior Publication Data
US 2023/0299652 A1    Sep. 21, 2023

(30) Foreign Application Priority Data
Aug. 12, 2020 (DE) .................... 102020004905.2

(51) Int. Cl.
*H02K 15/12* (2025.01)
*H05B 6/10* (2006.01)
*H05B 6/64* (2006.01)

(52) U.S. Cl.
CPC ............. *H02K 15/12* (2013.01); *H05B 6/101* (2013.01); *H05B 6/6485* (2013.01); *H05B 2206/022* (2013.01)

(58) Field of Classification Search
CPC ...... H02K 15/12; H05B 6/101; H05B 6/6485; H05B 2206/022; H05B 6/102;
(Continued)

(56) References Cited

U.S. PATENT DOCUMENTS

| | | | |
|---|---|---|---|
| 5,306,359 | A | 4/1994 | Eppeland |
| 2011/0059266 | A1 | 3/2011 | Borrel |
| 2013/0270259 | A1 | 10/2013 | Nebelung |

FOREIGN PATENT DOCUMENTS

| | | |
|---|---|---|
| DE | 69224349 T2 | 5/1998 |
| DE | 102012007959 A1 | 10/2013 |

(Continued)

*Primary Examiner* — Mohamad A Musleh
(74) *Attorney, Agent, or Firm* — Rogowski Law LLC

(57) ABSTRACT

Multiple temperature-control process for stators (7) and rotors of electric motors and components consisting of materials with different magnetic properties by means of a triplex furnace (1) for the quick, efficient, and uniform heating-up of preferably tubular components such as stators (7), wherein the magnetic parts of a component are primarily heated up by means of induction and at the same time non-magnetic parts of the same component are primarily heated up by means of infrared radiation, and at the same time and subsequently secondary heating takes place by means of convection, in particular by passive heating elements (10), which serves for finely adjusting the target temperature and for maintaining it.

20 Claims, 3 Drawing Sheets

(58) Field of Classification Search
CPC .. Y02P 10/25; C21D 1/26; C21D 1/34; C21D 1/42; C21D 8/1244; C21D 9/0043; C21D 9/0068; C21D 9/0075; F27B 17/00
See application file for complete search history.

(56) References Cited

FOREIGN PATENT DOCUMENTS

| | | | | |
|---|---|---|---|---|
| DE | 102017005532 A1 | * | 12/2018 | ............... D06C 3/10 |
| DE | 102018101226 A1 | | 7/2019 | |
| EP | 2640546 B1 | | 5/2012 | |
| EP | 2905346 A1 | | 8/2015 | |
| ES | 460079 A1 | * | 4/1978 | ............... C21D 1/42 |
| WO | 2013156015 A1 | | 10/2013 | |
| WO | 2015110456 A1 | | 7/2015 | |

* cited by examiner

MULTIPLE TEMPERATURE-CONTROL PROCESS FOR WORKPIECES BY MEANS OF A TRIPLEX FURNACE

CROSS-REFERENCE TO RELATED APPLICATIONS

This application is a national stage application (under 35 USC § 371) of PCT/EP2021/072456, filed Aug. 12, 2021, which claims benefit of DE 102020004905.2, filed Aug. 12, 2020, the contents of each of which is incorporated by reference herein.

BACKGROUND OF THE INVENTION

Technical Field and State of the Art

The present invention relates to a method and an exemplary device in the form of a triplex furnace for the quick, efficient, and uniform heating-up of preferably tubular components such as stators of electric motors consisting of different materials. The triplex furnace enables the simultaneous use of three different heating processes, adjusted to the different materials and parts of components such as electric motor stators.

In order to encapsulate and/or impregnate the current-carrying components of an electric motor, which are generally made of copper, it is necessary to heat the stators and rotors, which consist of steel sheets and copper rods, so-called hairpins, or copper wires, to temperatures of between 8° and 180° C. Stators and rotors are impregnated and/or encapsulated mainly to ensure that the components are fixed against each other, for better and more defined heat dissipation, and for additional electrical insulation.

The following invention is aimed particularly at electric motor stators comprising a soft iron laminated core and a copper winding. In newer motors, the copper winding is often replaced by welded copper hairpins, which are embedded in the laminated core at the inner diameter and project axially on both sides as so-called winding heads. An efficient, quick, and uniform temperature increase is wanted both when preheating the stator for impregnation and/or encapsulation and for the subsequent temperature increases for gelling and curing.

Current systems for impregnating or encapsulating these components have so far mostly used forced convection furnaces, into which the stators are placed for a minimum period of time, or through which said stators are passed in order to achieve the wanted temperature. The heat is transferred by means of convection. As a rule, these furnaces are heated by means of gas or electricity. In a vacuum, this type of heating is ineffective because the heat transfer medium, namely air, is missing. This method is inexpensive, well-tested, gentle, and insensitive to long dwell times; however, it does require considerable time, space, and energy.

For some years now, stators have occasionally been tempered by means of infrared radiation directed at the components from the outside. In this case, the heating radiation impinges directly on the surface of the object to be heated. As a result, heat transfer from the heat source to the air and from the air, or a gas, to the stator is eliminated. However, the surfaces of different materials are heated quite differently depending on their reflectance and thermal conductivity. Since the radiation acts on the thin copper parts in the same way as on the thick laminated core, a uniform temperature distribution in and on the stator can only be achieved by means of longer waiting times.

Induction furnaces are also known. In this type of furnace or this method for heating magnetic materials in particular, such as iron, a high-frequency alternating magnetic field flows through the component. Since copper is not magnetic, this method essentially only heats the laminated core. The temperature must then pass from the laminated core to the copper parts. Particularly in induction heating, special attention must be paid to hot spots, i.e., corners and edges where magnetic waves are concentrated. This is where overtemperatures occur very quickly, leading to the damage of the insulation or adjacent plastic parts.

DE 10 2017 005 532 A1 discloses a method and a heating device for inductively heating and keeping warm of a stator or armature of an electric machine, wherein the inductive heating is performed by means of electromagnetic fields of different frequencies that are adjusted to different materials. The laminated core and the protruding copper parts are heated by means of different inductors with different frequencies. In practice, achieving a uniform temperature at the stator, accurate down to a few degrees, turns out to be very difficult with direct heating methods such as induction and irradiation, and is fraught with waiting times. It is particularly problematic to measure the temperature on the parts that inevitably rotate continuously after impregnation. In particular, different starting temperatures or longer dwell times result in unacceptable deviations that impair the overall process.

Another method for tempering electric motor stators and rotors is resistance heating. It involves applying high low-frequency currents at low voltage to the winding. In this case, due to the electrical resistance, the heat is only generated in the current-carrying parts and must be transferred from there to the steel components, such as the laminated core. This takes a considerable amount of time if the same temperature is required on all components, besides being inefficient due to the high energy intensity.

In series production with the prescribed short cycle times, long periods for tempering the components translate into a plurality of workpiece carriers and tensioning devices, large furnaces with considerable space and energy requirements as well as long start-up and throughput times. A large number of components in the plant make it inflexible and expensive.

EP 2 905 346 A1 discloses a method for imprinting a temperature profile on a sheet steel component and a heat treatment device comprising a production furnace for heating the sheet steel component to a temperature above the AC3 temperature and a thermal aftertreatment station for imprinting a temperature profile on the sheet steel component, wherein one or more regions of the sheet steel component in the thermal aftertreatment station are cooled and heated by means of convection and/or by means of radiation and/or by means of heat conduction.

A control system for a method and a device for the heat treatment of parts made of aluminum or an aluminum alloy is disclosed in DE 692 24 349 T2.

A control device for a device for induction heating of a workpiece with an induction device is disclosed in DE 10 2012 007 959 A1.

DE 10 2018 101 226 A1 discloses a device for inductive hardening of elongated workpieces, such as axle shafts, side shafts, or drive shafts, comprising at least one hardening station and a tempering station, wherein at least one hardening station comprises an inductor unit for heating and a quenching unit for quenching the workpieces, wherein at least one multi-axis robot is provided for unloading the workpieces to be hardened into the hardening station from a supply unit and placing them on a discharge unit.

Finally, EP 2 640 546 B1 discloses a device for inductively heating metallic components during welding, comprising at least one flexible induction element and means for automatically controlling and regulating the power and, if necessary, the frequency of a medium-frequency generator connected to the induction element, wherein the flexible induction element and the coolant line can be plastically or elastically deformed multiple times and can be adapted manually or automatically to the shape of components to be heated.

The task is, therefore, to generate a method and a system that enables quick, energy-efficient, uniform, space-saving, and precise tempering of components made of different materials, such as stators made of steel and copper.

SUMMARY OF THE INVENTION

The new method is characterized by the simultaneous heating of components made of different materials using different heating processes with different heating sources, adjusted to the material and the component. For example, this method also allows stators to be heated simultaneously from the inside and outside. Using this kind of method and a device adapted to it, it is possible for the first time to heat such components very quickly, thus saving energy and space, and also to heat them uniformly. The new method is characterized by high energy efficiency because most of the heat is supplied directly to the component or, in the case of induction, is even generated in the component.

The new method also meets the requirement stipulating that impregnated stators and rotors, i.e., those sprinkled with resin that is still liquid, must rotate continuously to prevent dripping of the impregnating material and imbalance.

In contrast to conventional heat transfer furnaces, referred to here as convection furnaces, the direct introduction of a majority of the required heat quantity means that the thermal chamber can be designed to be relatively small, also because only a small amount of air circulation is required due to the rotating components. The small design results in minimal radiating surface and thus low heat loss. The thermally insulated enclosure of our proposed solution thus emits little heat to the environment. Due to the design feature that the heating elements for direct component heating also serve to feed the convection heating is another helpful feature to keep the furnace space or thermal chamber minimal. On the one hand, the IR emitters or reflectors can be moved so that the air surrounding the components is heated. On the other hand, ferritic passive heating elements in particular, on which the inductor acts, serve as a heat source for convective heating. The intensity with which the inductor acts on the passive heating elements is temperature-controlled. The inductor is preferably mounted so as to allow movement and can be adapted to different component sizes and, if necessary, to different component shapes by means of at least one actuator. The mobility of the inductor also allows it to be brought into the effective range of the passive heating elements. Thus, the same inductor can serve both for direct heating of the component and for tempering the passive heating elements for convection heating. Ferritic finned tubes, molded components, plates, rods, or grids are proposed as passive heating elements. The temperature can be measured just as reliably on these stationary elements as the air temperature in the heating station. Hence, the interaction of the inductor with the passive heating elements, together with the rotating component that provides air flow, creates a convection furnace. Optionally, a healing air fan can be used to enhance the circulation of the air in the thermal chamber. The convection heating process is used for slight adjustment of the component temperature, for temperature equalization in the component itself and for maintaining an achieved target temperature during waiting times, such as when the downstream system components are at a standstill. Indirect heating is activated in particular by reducing the distance between the passive heating element and the inductor, e. g., by swiveling, rotating, shifting, etc., and by applying varying degrees of heat to the inductor.

The feature of the new method is the simultaneous action of induction, IR radiation, and convection. Optionally, IR radiation is replaced or supplemented by resistance heating of the copper parts by means of high low-voltage currents.

If arranged appropriately, the passive heating elements can also be heated by the infrared radiators.

On the one hand, the intensity and duration of induction and/or IR irradiation from 0 to 100% is specified by the operator depending on the component. On the other hand, the heating power can be controlled on the basis of the difference between the actual and set temperatures, taking into account specified maximum temperatures. Since the temperature at these moving parts can only be measured imprecisely and, moreover, only at the surface, the temperature control of the component is preferably carried out according to the following scheme. The starting temperature of a stator with a known mass of copper and sheet steel is measured. The target temperature is fixed. The quantity of heat introduced can be determined based on the heating power introduced into the stator—which can be represented by the frequency converter for the induction heating—and the duration of exposure and can be compared with the calculated quantity of heat required in accordance with a specified degressive power curve. Alternatively, it is possible to program the heat quantity input into the component according to a table depending on the temperature rise and the component.

The known non-contact and contact measuring methods are used to measure temperature.

To ensure uniform temperature distribution on and in the stator, said stator should preferably rotate during the entire heating process and is also heated from the inside and outside. So that different components or stator sizes can be effectively heated with the same inductors and IR emitters, these are mounted in a way that allows them to move. This is also necessary for heating elements located inside the stators, to allow said stators to move on to the next station. A moving short inductor also enables the uniform heating of long stators by alternating linear movement. The same applies to the IR heating elements. In addition, this mobility of the active heating elements also enables the targeted start-up and heating of the passive heating elements for temperature control by convection.

Another feature of the new method is the simultaneous heating of the rotating component from inside and outside with different heat sources. The heat sources are adjusted to the respective material and the shape of the component. The intensity with which the heat sources act on the corresponding section of the component over a predetermined period of time results in the heat output to be applied or the desired temperature.

Convection aids direct component heating and becomes important mainly when it comes to temperature equalization in the component and maintaining the desired target temperature. The rotation of the components, in particular stators and rotors, ensures continuous flow around the components without the use of the otherwise customary circulating air blowers. This saves installation space, energy, and generates no noise. Since blowers and baffles need not be incorporated and the existing heating elements can be used, it is possible to have a very small boiler room that can be insulated inexpensively and heated quickly. With regard to great energy efficiency, the heated space is equipped with reflective elements such as mirrors or appropriate foils or coatings as far as possible. To enable the inspection of the triplex furnace chamber, a one-way mirror pane is installed in the interior, which reflects 60 to 95% of the heat radiation, but still makes it possible to look into the furnace.

To allow the pass through of the triplex furnace, it is equipped with flaps and or brushes or temperature-resistant drop curtains at the component feed openings and/or the thermal chamber recesses.

Uniform defined rotation of the stators is necessary, especially after application or insertion of the liquid impregnating compound, usually a varnish or resin, in order to maintain an even layer on the winding and uniform filling of the grooves. When stationary, the impregnating compound would drain off. In the case of rotating components such as rotors, the uneven distribution would also result in an unacceptable imbalance.

For components which cannot be heated simultaneously from the outside and inside due to a missing bore, the opposite or lined-up arrangement of the preferably movable heating elements is suggested.

An exemplary device for implementing the method in the form of a triplex furnace consists essentially of a thermal chamber and a component transport unit connected thereto. The component transport unit transports the component carriers in steps or continuously through the thermal chamber. For this purpose, the component carriers are rotatably mounted and positioned on a transport element or between several transport elements such as chains. To ensure the continuous rotation of the components, the component carriers are driven by means of a separate drive, which operates on pinions seated on the component carriers. Optionally, the rotary movement of the component carriers is generated by the same chains between which the component carriers equipped with sprockets are positioned.

The component carriers for rotating components are designed as inner clamps or external clamps and establish the connection between the moving components located in the thermal chamber and the attached component transport unit.

The thermal chamber contains the heating elements for direct and indirect component heating such as inductors, IR emitters as well as passive heating elements and IR radiation absorbers or reflectors for convective heating. The triplex furnace has a modular design and has at least one heating station that has the heating elements described above. The number of heating stations lined up in a triplex furnace depends on the technical specifications. The enclosure gives little space to the largest component in order to minimize the volume of the thermal chamber and achieve a small temperature difference between the floor and the ceiling. The thermal chamber has a recess on one side along its entire length towards the component transport unit, in which the workpiece carrier moves. The recess is preferably covered with multi-row brush strips or other resilient cover elements. If downstream or upstream plant components have a different temperature level than the thermal chamber, these are closed at the inlet and outlet with sliding sealing elements such as flaps or gates fitted with actuators. These inlets, which are preferably designed as sliding elements, are only opened for the passage of the workpiece carriers, if necessary, with a component. Since the heating of the components and in particular of the encapsulation material or the impregnating resin during gelling and curing results in vapors, the thermal chamber is equipped with a—preferably controllable—exhaust system. The thermal chamber is equipped with a plurality of sensors, in particular contact and non-contact temperature sensors.

Additional objectives, advantages, features and application possibilities of the present invention ensue from the description below of embodiments making reference to the drawings. In this context, all of the described and/or depicted features, either on their own or in any meaningful combination, constitute the subject matter of the present invention, also irrespective of their compilation in the claims or the claims to which they refer back.

DESCRIPTION OF THE DRAWINGS

The method and an exemplary device in the form of a triplex furnace are explained in more detail in the figures shown in the drawings.

There is shown in.

DETAILED DESCRIPTION

Figure 1:
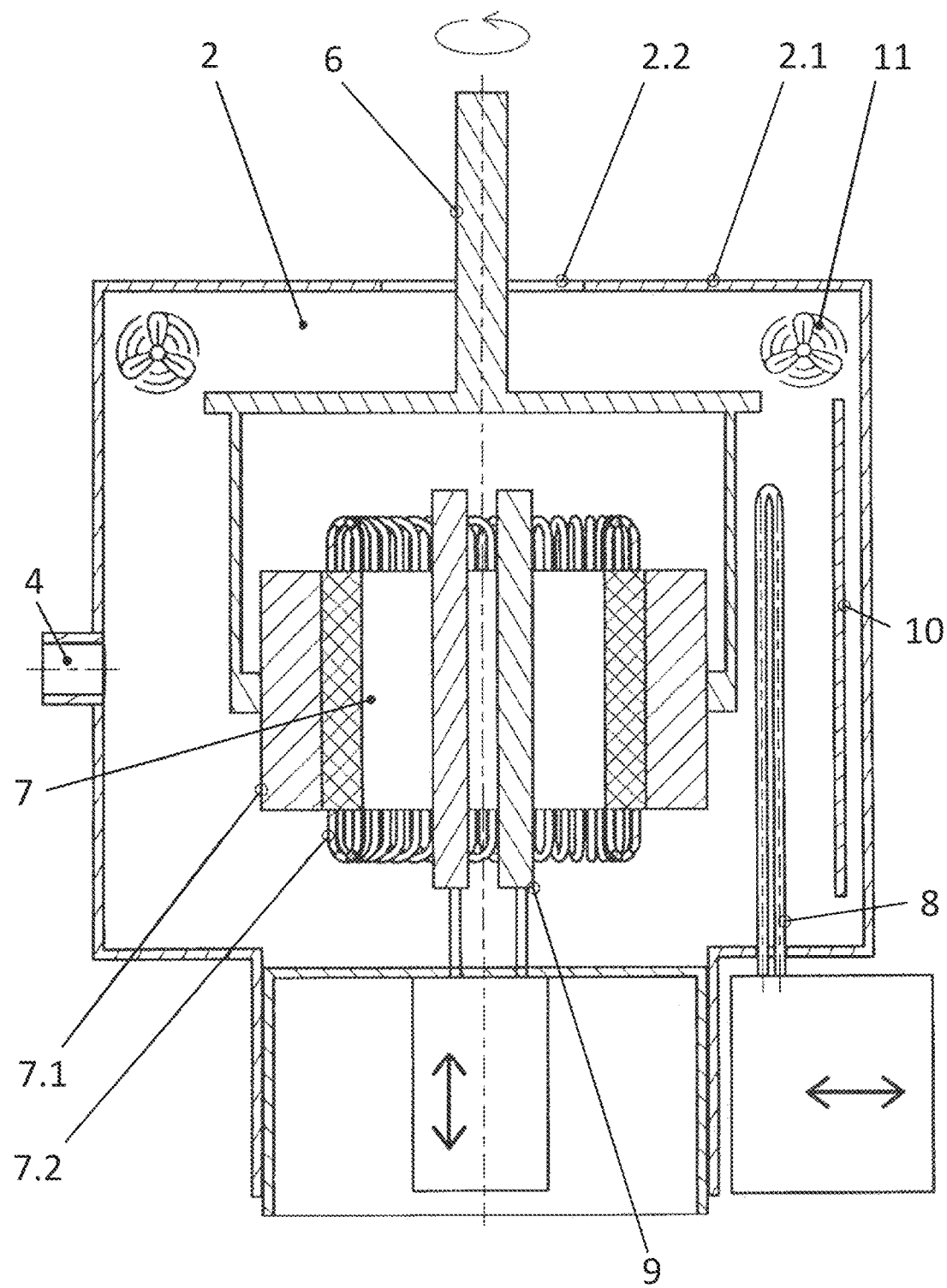
FIG. 1 a possible arrangement of the primary heating elements for simultaneous heating of a stator (7) from inside and outside with different heating sources.

FIG. 1 shows a sectional view of a simplified possible arrangement of the active and passive heating elements in the thermal chamber (2), using the example of a component in the form of a stator (7) for electric motors, which essentially consists of a laminated core (7.1) made from soft iron sheets and a copper winding (7.2). The copper rod ends projecting beyond the laminated core on both sides are referred to as the winding head. The laminated core has longitudinal grooves on its inner circumference, into which the copper rods are embedded. The stator (7) is supported, transported, and rotated by a component carrier (6), which is shown here in simplified form as an external tensioner. The thermal chamber (2) is defined by a thermally insulating thermal chamber enclosure (2.1). The thermal chamber enclosure (2.1) comprises at least one slot-shaped recess (2.2) towards the component transport unit (5). Along this recess (2.2) the component carrier (6) and with it also the stator (7) are moved in order to pass from one heating station to the other or from one plant component to the next, all while rotating. For the primary heating of the stator (7), both an inductor (8) arranged on the outside for inductive heating, in particular of the laminated core, and at least one infrared radiator (9) positioned in the central bore of the stator (7) for heating the copper rods can be seen. In conjunction with an actuator and thanks to the movable bearing of the primary heating elements, they can be adapted to different component sizes, in particular to different stator dimensions, or moved into the stators (7). Furthermore, primary heating elements and in particular the inductor (8) can be moved into the effective range of the passive heating elements (10) in order to temper them for convective heating of the thermal chamber (2) and thus of the component. In the case shown, the IR heating tubes are also mounted in a way that they can move axially into and out of the central bore of the stator (7).

The inductor (8) and/or the IR heating tubes are preferably mounted such as to allow sliding and are connected to actuators for automatic positioning. Thus, the primary heating elements can be adapted to different component dimensions or stator dimensions by means of a control program and, at the same time, can be used as an energy source for the passive heating elements (10) for convective heating of the thermal chamber (2) and the stator (7), e. g., by activating the inductor (8) and moving it into the interaction range of ferritic passive heating elements (10). In this way, the inductor (8) heats either the component or the passive heating element (10). The same method can be used with the IR tubes. Air circulation in the thermal chamber (2) is provided by the rotary motion of the stator (7) and/or a hot air fan (11).

With this arrangement of heating elements, the stator (7) is heated both from the outside and from the inside by direct heat input by induction into the laminated core and IR radiation into the copper rods and/or additionally and subsequently on all sides by the temperature-controlled air flowing around it, i.e., by convection, to maintain the temperature or to adapt it to the target temperature. The thermal chamber (2) is preferably already heated to the prescribed temperature when the stator (7) is retracted by means of the infrared radiators (9) and the passive heating elements (10).

Figure 2:
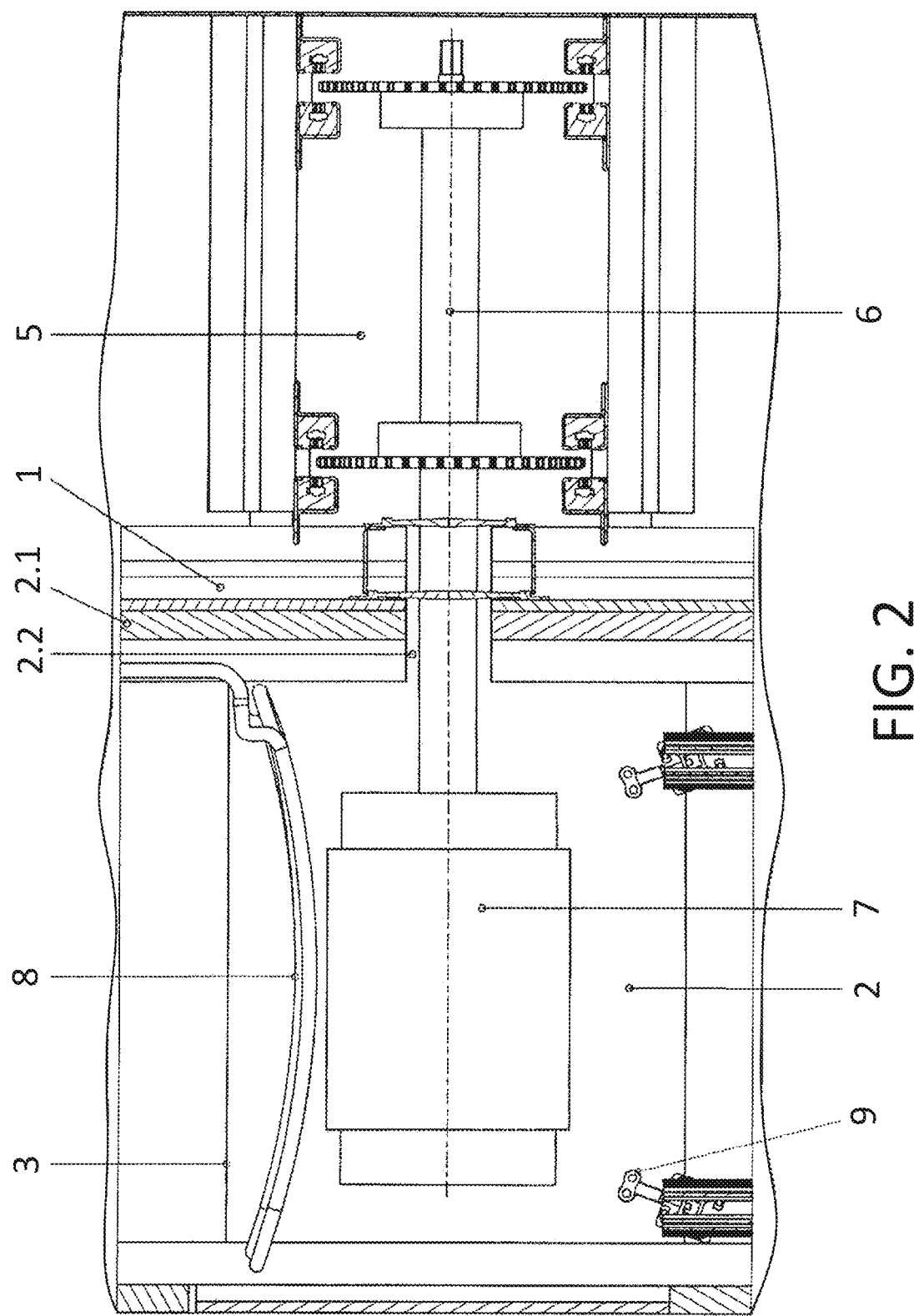
FIG. 2 a section of an exemplary design of a triplex furnace (1)

FIG. 2 shows a cross-sectional view of a simplified triplex furnace (1) consisting of a component transport unit (5) and a thermal chamber (2). The component carrier (6), which is shown as an inner clamp with a tensioned stator (7), is mounted with its sprockets between chains in the component transport unit (5) and extends into the thermal chamber (2) through a recess (2.2) made along the transport path between the component transport unit (5) and the thermal chamber (2). To allow the axis of the component carrier (6) to move through the sealed recess (2.2), the recess (2.2) is provided with flexible covers, e. g., by means of brushes, curtains, resilient slats, and resilient heat-resistant seals such as inflated silicone hoses. In this illustration, the inductor (8) is arranged externally above the laminated core and the infrared radiators (9) are directed from outside onto the copper rods of the winding heads. The tempered air surrounding the stator (7) for convective heating is not depicted. The thermal chamber (2) consists of an enclosure lined with a thermal insulation layer and at least one component feed opening (3), which is also used for component unloading.

Figure 3:
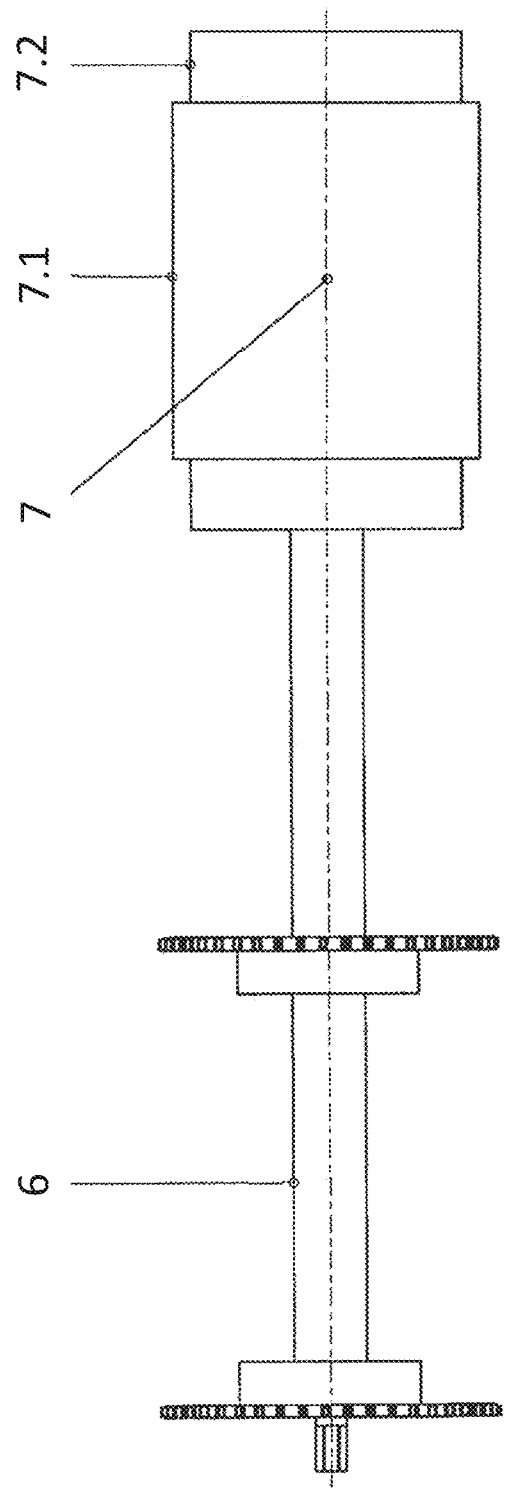
FIG. 3 a component carrier (6) as an inner clamp with a stator (7) mounted thereon.

FIG. 3 shows a component carrier (6) which is equipped as an inner clamp for components with centric bores and carries a stator (7). In the embodiment shown, the component carrier (6) has two sprockets, which are both the bearing points and drive elements for the rotation and transport of the stator (7). The sprockets are supported between chains, as shown in DE 10 2019 004 954.3.

LIST OF REFERENCE NUMERALS

1=Triplex furnace
2=Thermal chamber
2.1=Thermal chamber enclosure
2.2=Thermal chamber recess
3=Component feed opening
4=Suction opening
5=Component transport unit
6=Component carriers
7=Stator
7.1=Laminated core
7.2=Copper winding
8=Inductor
9=Infrared radiator
10=Passive heating element
11=Hot air fan

The invention claimed is:

1. A multiple temperature-control process for components that comprise different materials with different magnetic and thermal properties, comprising:
   heating magnetic parts of a component primarily by induction to a target temperature;
   simultaneously heating non-magnetic parts of the same component primarily by infrared radiation to the target temperature;
   simultaneously finely adjusting and/or maintaining the target temperature of the component by convection heating.

2. The multiple temperature-control process according to claim 1, wherein the component is tubular and is simultaneously heated with the induction and with the infrared irradiation, during a primary heating step to ensure quick and uniform heating from inside and from outside of the tubular component.

3. The multiple temperature-control process according to claim 1, wherein heating is by an internal heating source and an external heating source, and wherein intensity of the internal heating source and intensity of the external heating source are regulated and controlled independently of each other according to an energy requirement and the target temperature of the material on or in the component.

4. The multiple temperature-control process according to claim 1, further comprising: rotating the component during heating to ensure uniform temperature distribution and enhanced heat transfer during convective heating.

5. The multiple temperature-control process according to claim 1, wherein convection heating of the component originates partly from an infrared source reflected by the component or the infrared source irradiated past the component.

6. The multiple temperature-control process according to claim 1, wherein the non-magnetic parts of the component to be heated are electrically conductive and are heated by resistance heating due to high electricity transmission in addition to or as an alternative to infrared irradiation.

7. The multiple temperature-control process according to claim 1, further comprising: assessing masses and thermal capacity of the magnetic material and the non-magnetic material of the component and determining a required quantity of heat to heat the magnetic material and the non-magnetic material of the component based on the masses of said materials and their thermal capacity, such that the thermal energy acting on each material of a component is supplied as prescribed by a predetermined regimen until the desired quantity of heat is introduced to reach the target temperature.

8. The multiple temperature-control process according to claim 1, wherein the components are stators and rotors of electric motors that comprise soft iron sheets and copper rods.

9. The multiple temperature-control process according to claim 1, further comprising:
   linearly moving one or more infrared radiators and one or more inductors when heating the component.

10. The multiple temperature-control process according to claim 1, wherein convection heating is introduced by at least one ferritic passive heating element which is tempered by an inductor.

11. A triplex furnace, comprising: at least one heating station in a thermal chamber, said heating station comprising a primary heater with at least one inductor that is mounted so as to allow movement and at least one infrared radiator that is mounted so as to allow movement;
 a secondary convection heater; and
 at least one component transport unit located outside the thermal chamber and having a component rotary drive.

12. The triplex furnace according to claim 11, wherein the secondary convection heater has ferritic passive heating elements that are connected to at least one inductor.

13. The triplex furnace according to claim 11, further comprising actuators to which the at least one inductor and the at least one infrared radiator are connected, so that positions of the at least one inductor and at least one infrared radiator in the heating station may be changed.

14. The triplex furnace according to claim 11, further comprising: a thermally insulated thermal chamber with at least one sealable component feed opening; and a thermal chamber recess running along the direction of movement of the component; temperature sensors lighting and at least one one-way mirrored glass pane.

15. The triplex furnace according to claim 14, further comprising: a component transport device which is connected to the thermal chamber; and component carriers associated with the component transport device that project into the thermal chamber and are moved and set in rotation via actuators by means of machine elements.

16. The triplex furnace according to claim 11, wherein the inductor is configured as a flexible hollow body which can optionally be deformed by actuators.

17. The triplex furnace according to claim 16, wherein the inductor is a copper flex tube or a corrugated copper tube.

18. The triplex furnace according to claim 11, further comprising: a temperature control for the at least one inductive heater, a temperature control for the at least one infrared heater, a temperature control for the secondary convection heater, and a temperature control for the at least one component transport unit.

19. The triplex furnace according to claim 11, wherein a plurality of heating stations with primary heaters and secondary convection heaters are arranged in series in the thermal chamber.

20. The triplex furnace according to claim 11, further comprising one or more infrared light absorbers as passive heating elements for the at least one infrared radiator.

* * * * *